(12) United States Patent
Nikolovski

(10) Patent No.: US 9,007,348 B2
(45) Date of Patent: Apr. 14, 2015

(54) DEVICE AND METHOD FOR LOCATING A LOCALLY DEFORMING CONTACT ON A DEFORMABLE TOUCH-SENSITIVE SURFACE OF AN OBJECT

(75) Inventor: Jean-Pierre Nikolovski, Chatenay-Malabry (FR)

(73) Assignee: Commissariat à l'énergie atomique et aux énergies alternatives, Paris (FR)

(*) Notice: Subject to any disclaimer, the term of this patent is extended or adjusted under 35 U.S.C. 154(b) by 192 days.

(21) Appl. No.: 13/386,042

(22) PCT Filed: Jun. 2, 2010

(86) PCT No.: PCT/FR2010/051070
§ 371 (c)(1),
(2), (4) Date: Mar. 22, 2012

(87) PCT Pub. No.: WO2011/015733
PCT Pub. Date: Feb. 10, 2011

(65) Prior Publication Data
US 2012/0200517 A1    Aug. 9, 2012

(30) Foreign Application Priority Data
Jul. 29, 2009  (FR) ...................................... 09 55322

(51) Int. Cl.
*G06F 3/043* (2006.01)
*G06F 3/041* (2006.01)

(52) U.S. Cl.
CPC ............ *G06F 3/0436* (2013.01); *G06F 3/0433* (2013.01); *G06F 3/041* (2013.01)

(58) Field of Classification Search
USPC ................................................. 345/173–177
See application file for complete search history.

(56) References Cited

U.S. PATENT DOCUMENTS 3,673,327 A  *  6/1972  Johnson et al. ............ 178/18.04
4,712,037 A     12/1987 Verbeek et al.
(Continued)

FOREIGN PATENT DOCUMENTS

WO     2008 142345      11/2008

OTHER PUBLICATIONS

International Search Report Issued Mar. 31, 2011 in PCT/FR10/51070 Filed Jun. 2, 2010.
(Continued)

*Primary Examiner* — Waseem Moorad
*Assistant Examiner* — Sujit Shah
(74) *Attorney, Agent, or Firm* — Oblon, McClelland, Maier & Neustadt, L.L.P.

(57) ABSTRACT

A device for locating a locally deforming contact on a deformable touch-sensitive surface of an object includes at least one transmitting transducer and at least one receiving transducer configured to respectively transmit and capture elastic mechanical waves propagating in the deformable touch-sensitive surface of the object. Further, an electronic central processing unit is connected to the transmitting and receiving transducers and is programmed to detect a frequency offset of at least one natural mode of a resonant vibration of the touch-sensitive surface due to presence of the locally deforming contact, the vibration being produced by the propagation of the waves transmitted in the touch-sensitive surface, and to locate the locally deforming contact by analyzing the frequency offset.

11 Claims, 4 Drawing Sheets

(56) References Cited

U.S. PATENT DOCUMENTS

| | | |
|---|---|---|
| 5,541,372 A | 7/1996 | Baller et al. |
| 2002/0126103 A1* | 9/2002 | Knowles et al. ............. 345/177 |
| 2002/0149570 A1* | 10/2002 | Knowles et al. ............. 345/173 |
| 2004/0263492 A1* | 12/2004 | Chao et al. .................... 345/177 |
| 2005/0110774 A1* | 5/2005 | Zuta et al. ..................... 345/177 |
| 2006/0109261 A1* | 5/2006 | Chou et al. ................... 345/177 |
| 2007/0171212 A1* | 7/2007 | Sakurai et al. ................ 345/177 |
| 2007/0263014 A1* | 11/2007 | Ketola et al. .................. 345/684 |
| 2008/0198145 A1 | 8/2008 | Knowles et al. |
| 2009/0273583 A1* | 11/2009 | Norhammar .................. 345/177 |
| 2010/0026667 A1* | 2/2010 | Bernstein ...................... 345/177 |
| 2010/0283745 A1 | 11/2010 | Nikolovski et al. |

OTHER PUBLICATIONS

U.S. Appl. No. 13/386,257, filed Jan. 20, 2012, Nikolovski, et al.

* cited by examiner

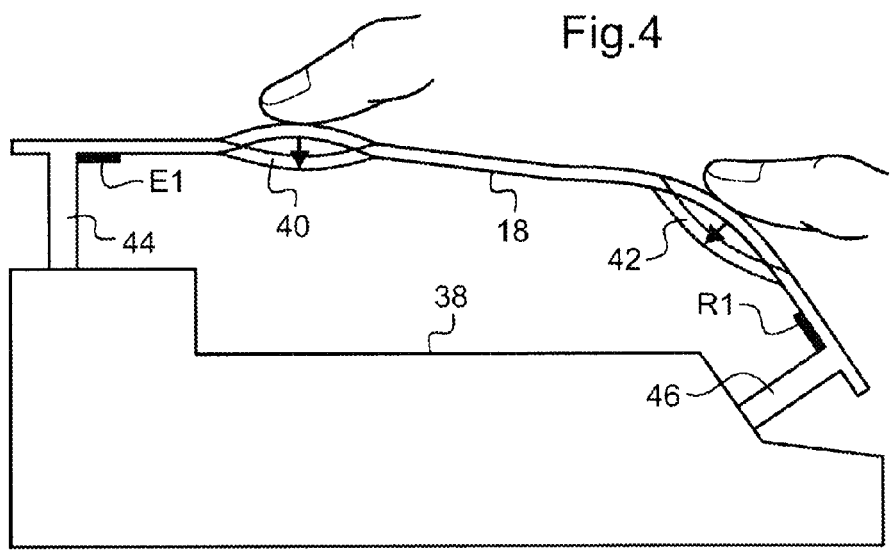
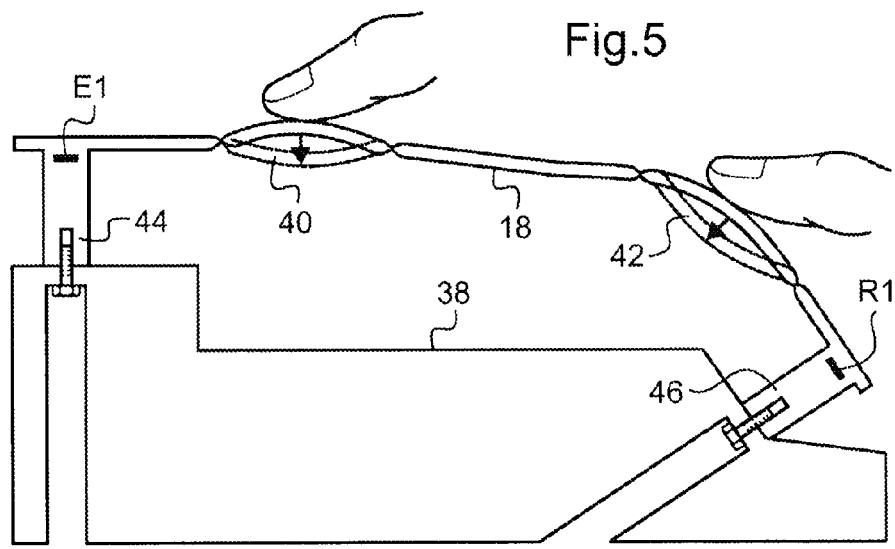

DEVICE AND METHOD FOR LOCATING A LOCALLY DEFORMING CONTACT ON A DEFORMABLE TOUCH-SENSITIVE SURFACE OF AN OBJECT

BACKGROUND (1) Field

This invention relates to a device for locating a locally deforming contact on a deformable touch-sensitive surface of an object. It also relates to a method implemented by this device.

(2) Description of the Related Art

There are many objects that have a touch-sensitive surface, including mobile phones and other portable personal digital assistance devices. Their touch-sensitive interface is usually a flat rectangular screen with which a user can interact using a stylus or a finger. Note, however, that the invention relates more generally to any type of object having a deformable touch-sensitive surface that is not necessarily flat or rectangular in shape. It therefore advantageously applies to communicating objects with a touch-sensitive and intuitive man-machine interface, such as robots, having a three-dimensional deformable shell attached to a rigid support by a limited number of attachment points.

By a "deformable" shell or touch-sensitive surface, this means a two-dimensional or three-dimensional surface, capable of changing shape in the sense of the static and dynamic elasticity of its materials when it is subjected to static or dynamic stress, such as a touch, a contact force, a mechanical impulse, or even a shock, and able to exhibit resonant vibrations when it is excited by elastic mechanical waves, such as impulses, so as to deform by bending, even on a submillimetric scale that is imperceptible to the naked eye. Plastic, glass, or metal shells are suitable.

All known objects with a touch-sensitive surface have a device for locating touches or impacts using one or more detection techniques. A strong trend to reduce the manufacturing cost and to reduce congestion aims to adopt only the simplest technologies that use a limited number of sensors. The invention thus relates more specifically to a locating device that implements a technology to detect the propagation of elastic mechanical waves on a touch-sensitive surface, particularly through the use of detectors, such as piezoelectric transducers.

A first solution is disclosed in French patent applications published under numbers FR 2 725 513, FR 2 787 608, and FR 2 811 107. It is based on measuring a time interval for transferring a wave packet to multiple piezoelectric detectors and on the deterministic calculation, using a pre-established mathematical formula, of the position of a source that transmits said wave packet. This wave packet is more specifically transmitted by an acoustic source coming into contact with the touch-sensitive surface. Generally, it is then possible to locate an impact of a finger or stylus, since that is then the issuer of an impulse. But with this technology, it is not possible to detect the persistence of a touch after impact or the movement of the acoustic source on the touch-sensitive surface, except to plan that the acoustic source regularly transmits wave packets. One is then limited to applications that use a stylus that repeatedly transmits wave packets. In addition, this technology is well suited to touch-sensitive surfaces presented in the form of isotropic flat plates, but poorly suited to any three-dimensional shells that do not allow for a deterministic calculation of the position of the acoustic source using a pre-established mathematical formula. Finally, this technology does not detect a static stress or the force of a touch (stroke, inimical interaction, etc.).

A second solution is disclosed in the French patent application published under the number FR 2 841 022. It is based on a recognition of the position of an impact by learning. The implemented method operates a cross-correlation between at least one acoustic signal measured from the detection of an acoustic wave generated by an impact on the touch-sensitive surface of the object and a reference set, called a "signatures set", comprised of prerecorded acoustic impulse responses, each being relative to a predefined position that one wants to associate to a function and recognize when an impact occurs at that position. Here again, it is possible to locate an impact, but not the persistence of a touch after the impact, the movement of a finger or of a stylus on the touch-sensitive surface, a static stress, or the force of a touch. However, this solution is well suited for any three-dimensional shells, even those having a complex shape.

To be able to more effectively measure any touch, specifically its persistence, whether it is a static touch or a movement, another solution consists of measuring the disruption of a touch on the propagation of elastic mechanical waves regularly transmitted in the touch-sensitive surface independent of this touch.

The invention relates to this type of solution. It thus applies to a device for locating a locally deforming contact on a deformable touch-sensitive surface of an object, comprising:
- at least one transmitting transducer designed to transmit elastic mechanical waves propagating in the deformable touch-sensitive surface of the object,
- at least one receiving transducer designed to capture elastic mechanical waves propagating in the deformable touch-sensitive surface of the object, and
- a central processing unit, connected to the transmitting and receiving transducers and programmed to analyze a signal captured by the receiving transducer and to deduce from it the presence or absence of a touch.

Such a device is described in the international patent applications published under the number WO 2008/142345. It more specifically provides for a reliable location of a touch by propagating waves having multiple frequency components corresponding to natural vibrational frequencies of the object. The propagation of these waves over a period of time in the touch-sensitive surface can identify patterns of vibration at different wavelengths, including resonant traces of bending modes. These have the characteristic of being more highly disrupted than resonant traces of modes with vibrations on the plane of the touch-sensitive surface of the object, so that the cushioning or absorption generated by a finger in contact with the touch-sensitive surface, even if it is thick, varies measurably from one natural mode to another and from one contact position to the other. It is then possible to locate a touch by a learning method, once a sufficient number of resonant traces are identified on the surface of the object.

This method offers the advantage of requiring only a small number of transmitting and/or receiving transducers, and it can operate on three-dimensional shells of any shape with a measurement rate of up to several dozen locations per second. However, to function effectively, this device requires a touch having a sufficient contact surface with the touch-sensitive surface in order to achieve detectable absorption. It is therefore poorly suited for detecting near-pinpoint touches, such as those caused by the tip of a stylus. It is also well suited for thin shells but poorly suited for thick shells.

It may therefore be desirable to provide a device for locating a locally deforming contact on a deformable touch-sensitive surface of an object that overcomes at least some of the problems and constraints mentioned above.

BRIEF SUMMARY

The invention therefore relates to a device for locating a locally deforming contact on a deformable touch-sensitive surface of an object, comprising:
- at least one transmitting transducer designed to transmit elastic mechanical waves propagating in the deformable touch-sensitive surface of the object,
- at least one receiving transducer designed to capture elastic mechanical waves propagating in the deformable touch-sensitive surface of the object, and
- one central processing unit, connected to the transmitting and receiving transducers, in which the central processing unit is programmed to:
- detect a frequency offset of at least one natural mode of a resonant vibration of the touch-sensitive surface due to the presence of the locally deforming contact, said vibration being produced by the propagation of the waves transmitted in said touch-sensitive surface, and
- locate the locally deforming contact by analyzing said frequency offset.

The invention has a very different approach than the traditional approaches using the propagation of elastic mechanical waves, such as what is proposed in the document WO 2008/142345. Indeed, it is not based on the absorption of natural modes of vibration generated by a touch, but on the measurement of an offset in frequency of these natural modes due to the presence of this touch. By a two-dimensional or three-dimensional extension of the phenomenon of increasing the natural resonant frequency of a guitar string as a result of the position of a touch holding down the string, there is a touch contact or long impact that causes an increase in the natural frequencies of vibration of a touch-sensitive surface, provided that the resonating surface is sufficiently held in place. It appears that the frequency offset of one or more natural modes of vibration of the touch-sensitive surface of the object is discriminating according to the position of the contact. It also appears that this frequency offset is sensitive to the force of the contact since the touch-sensitive surface of the object is deformable and can distinguish a stroke from an inimical touch due to excess pressure, for example. It is also perceptible when the contact is near-pinpoint, such as a touch from the tip of a stylus.

Optionally, a device according to the invention may comprise several rigid attachment zones between the deformable touch-sensitive surface and the object, these zones forming nodes of resonant vibration for the touch-sensitive surface, and the transmitting and receiving transducers can be located in these zones.

Also optionally, a device according to the invention may comprise at least one pair of transmitting and receiving transducers, and each transducer in a pair may be located in a zone that is diametrically opposite that of the other transducer of the same pair in the deformable touch-sensitive surface.

Also optionally, a device according to the invention may comprise several pairs of transmitting and receiving transducers, each pair being arranged at the ends of a line that is characteristic of the deformable touch-sensitive surface, specifically a line of symmetry for the touch-sensitive surface.

Also optionally, the transmitting transducers are directional transmission transducers for elastic mechanical waves and are oriented to present a directional pattern of maximum intensity in the direction of the other transducer within the same pair.

Also optionally, because each transducer is designed to either transmit or receive elastic mechanical waves, the central processing unit is programmed to select one of the two transducers in a single pair as a transmitting transducer based on an approximate presupposed location of the contact to be detected.

Also optionally, the transducers are connected to spacers that attach the deformable touch-sensitive surface to a rigid frame, such that vibrations are caused in the spacers and transmitted to the deformable touch-sensitive surface when such vibrations come from transmitting transducers or transmitted to receiving transducers when they come from the deformable touch-sensitive surface.

Also optionally, the central processing unit is also programmed, in response to detecting the frequency offset due to the presence of the locally deforming contact, to excite at least one transmitting transducer using an electrical validation signal that generates vibroacoustic waves the sound frequency of which is related to the detected frequency offset and the amplitude of which is substantially higher than other elastic mechanical waves transmitted in the touch-sensitive surface for the location of the contact.

The invention also relates to a communicating object comprising a shell with a deformable touch-sensitive surface and a device such as defined above, in which the deformable touch-sensitive surface of the shell comprises at least one locally delineated zone that is functionalized with a specific deformability, such as monostability or asymmetric bistability.

The invention also relates to a method for locating a locally deforming contact on a deformable touch-sensitive surface of an object, comprising the following steps:
- monitoring of a locally deforming contact by propagation, in the touch-sensitive surface of the object, of elastic mechanical waves from at least one transmitting point of the object, and by detecting said elastic mechanical waves in at least one receiving point of the object to obtain at least one captured signal, and
- locating a locally deforming contact on the touch-sensitive surface of the object based on characteristics of the captured signal, in which the locating step comprises the analysis of a frequency offset of at least one natural mode of a resonant vibration of the touch-sensitive surface due to the presence of the locally deforming contact, said vibration being produced by the propagation of the waves transmitted in said touch-sensitive surface.

Optionally, the monitoring step comprises the transmission of elastic mechanical pulse waves with frequencies scanned in a predetermined range of frequencies including at least one fundamental natural frequency of resonant vibration of the touch-sensitive surface without contact and the double of that frequency.

BRIEF DESCRIPTION OF THE DRAWINGS

The invention will be better understood using the following description, given purely as example and referring to the accompanying drawings, in which.

DETAILED DESCRIPTION

Figure 1:
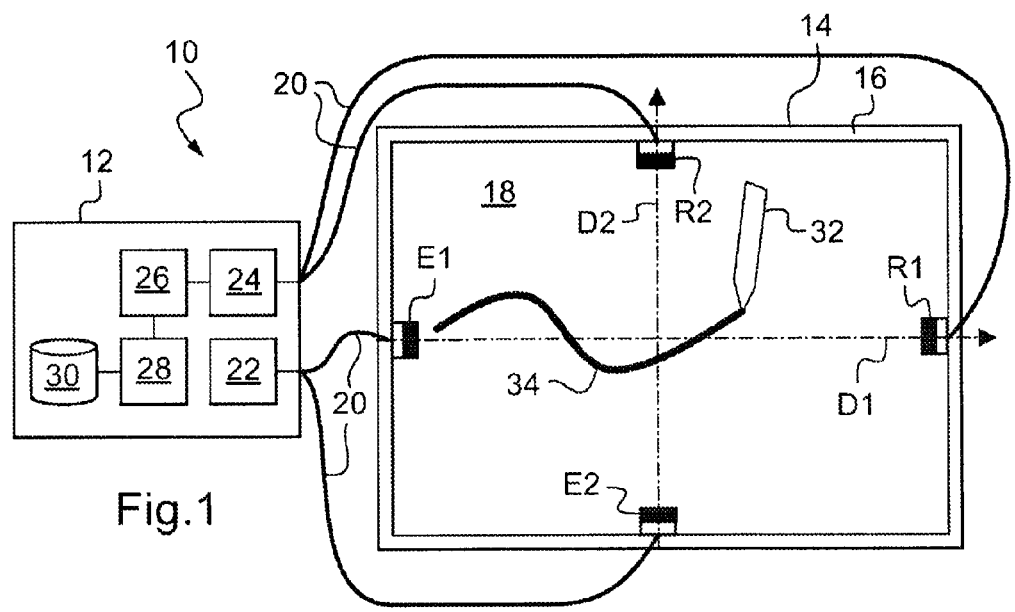
FIG. 1 schematically shows a front view of a device for locating a locally deforming contact on a deformable touch-sensitive surface of an object, according to a first embodiment of the invention, FIG. 2 schematically shows a partial front view of a device for locating a locally deforming contact on a deformable touch-sensitive surface of an object, according to a second embodiment of the invention, FIG. 3A schematically shows a section view of an asymmetric bistability zone that is locally delineated and functionalized in the touch-sensitive surface illustrated in FIG. 2, FIGS. 3B and 3C schematically and graphically illustrate a deformation and the corresponding force/displacement curve for the asymmetric bistability zone in FIG. 3A, FIGS. 4, 5, and 6 schematically show a section view of the touch-sensitive surface illustrated in FIG. 2, according to three embodiments.

The device 10 for locating a locally deforming contact on a deformable touch-sensitive surface of an object, shown in FIG. 1, comprises a central processing unit 12 and an object 14, such as an interactive tablet.

The interactive tablet 14 comprises a frame 16 and a touch-sensitive surface 18 held in place by the frame on at least a portion of its periphery. The touch-sensitive surface 18 is presented, for example, in the form of a thin rectangular plate made of metal, glass, or plastic, which vibrates when elastic mechanical waves are transmitted in its depth. It is considered to be deformable in the sense that, as indicated above, it presents resonant vibrations when it is excited by elastic mechanical waves, specifically impulses, so as to deform by bending, even on a submillimetric scale that is imperceptible to the naked eye, such as in the case of glass.

In the example illustrated in FIG. 1, four piezoelectric transducers E1, E2, R1, and R2 are attached to the inner face of the touch-sensitive plate 18, meaning that it is not accessible to touch and oriented toward the inside of the frame 16. Specifically, they can be adhered to the plate 18, by means of a conductive epoxy or cyanoacrylate adhesive. They can also be secured by localized means of attachment of the touch-sensitive plate 18 to a rigid support.

These piezoelectric transducers are, for example, transducers made using PZT ferroelectric ceramics. They comprise:

two transmitting transducers E1 and E2 capable of transmitting elastic mechanical waves (i.e. acoustic waves in the broad sense) in modes of bending, such as antisymmetric Lamb waves, such that they are propagated in the touch-sensitive plate 18, two receiving transducers R1 and R2 capable of capturing elastic mechanical waves propagating in modes of bending in the touch-sensitive plate 18.

These four transducers are also divided into two transmitting/receiving pairs. A first transmitting/receiving pair is comprised of the transducers E1 and R1 arranged at the two ends of a first line D1 characteristic of the touch-sensitive plate 18. This line D1 is a line of symmetry of the touch-sensitive plate 18: this is more specifically its longitudinal centerline. The second transmitting/receiving pair is comprised of the transducers E2 and R2 arranged at the two ends of a second line D1 characteristic of the touch-sensitive plate 18, perpendicular to the line D1. This line D2 is another line of symmetry of the touch-sensitive plate 18: this is more specifically its transverse centerline.

In a preferred embodiment of the invention, the two ends of the line D1 are also zones of rigid attachment between the deformable touch-sensitive plate 18 and a rigid support of the object 14. In addition, the transmitting transducer E1 is a directional transmission transducer for elastic mechanical waves. It is more specifically made with shape and orientation chosen to present a directional pattern of maximum intensity in the direction of the line D1, meaning in the direction of the receiving transducer R1. Therefore, when pulse waves are transmitted by the transmitting transducer E1, in the direction of the line D1, they cause a resonant vibration of the touch-sensitive plate 18 for at least one fundamental natural frequency, related to its length in the absence of contact on the plate, knowing that the zones of rigid attachments, i.e. the zones where the transducers E1 and R1 are arranged, form nodes of resonant vibration at all natural frequencies of the touch-sensitive plate 18 in this direction D1.

Similarly, both ends of the line D2 are also zones of rigid attachment between the deformable touch-sensitive plate 18 and a rigid support of the object 14. In addition, the transmitting transducer E2 is a directional transmission transducer for elastic mechanical waves and is made with shape and orientation chosen to present a directional pattern of maximum intensity in the direction of the line D2, meaning in the direction of the receiving transducer R2. Therefore, when pulse waves are transmitted by the transmitting transducer E2, in the direction of the line D2, they cause a resonant vibration of the touch-sensitive plate 18 for at least one fundamental natural frequency, related to its width in the absence of contact, knowing that the zones of rigid attachments, i.e. the zones where the transducers E2 and R2 are arranged, form nodes of resonant vibration at all natural frequencies of the touch-sensitive plate 18 in this direction D2.

The transducers E1, E2, R1, and R2 are connected to the central processing unit 12 by at least one wired or radio connection 20. The central processing unit 12 is programmed to:

detect a frequency offset of at least one natural mode of a resonant vibration of the touch-sensitive surface due to the presence of a locally deforming contact, said vibration being produced by the propagation of the waves transmitted in said touch-sensitive surface, and locate the locally deforming contact by analyzing said frequency offset.

The connection(s) 20 to the transducers E1, E2, R1, and R2 may be comprised specifically of coaxial audio cables or any other shielded connection.

More specifically, the central processing unit 12 comprises a transmitter 22 programmed to control the transmission of elastic mechanical pulse waves in the direction D1 from the transmitting transducer E1, these waves generating a resonant vibration for bending the touch-sensitive plate 18 according to multiple natural modes (i.e. a fundamental mode and multiple harmonic modes). It also comprises a receiver 24 programmed to capture a signal that is characteristic of the resonant vibration of the touch-sensitive surface from the transducer R1, the spectrum of this captured signal comprising peaks of amplitude at the frequencies of the natural modes of the plate in the direction D1. The receiver 24 of the central processing unit 12 is therefore connected to a module 26 for analyzing the spectrum, programmed to detect peaks of frequency of the captured signal, specifically by calculating a Fast Fourier Transform. In the absence of contact on the touch-sensitive plate 18, the natural modes detected are characteristic of its length. In the presence of a contact on the touch-sensitive plate 18, if the line D1 is considered to be the x-axis of a frame of reference related to the touch-sensitive plate, the natural modes detected are offset relative to the natural modes that are detectable in the absence of contact, and these offsets are characteristic of the x position of the contact.

To better understand this phenomenon, a one-dimensional analogy can be made with the vibration of a guitar string stretched between two fixed ends and excited by plucking, which generates, in the portion of string vibrating against the opening of the resonance box, sound frequencies with varying resonance, depending on the location where it may be held on its length. In other words, the use of a stylus or a finger to apply a locally deforming contact on a deformable touch-sensitive plate 18 is similar to inserting an additional fixed point causing a significant offset of resonant frequencies depending on the position and nature of the local blocking, whether full or partial, of the deformable touch-sensitive plate 18.

Similarly, the transmitter 22 is programmed to control the transmission of elastic mechanical pulse waves in a direction D2 from the transmitting transducer E2, these waves generating a resonant vibration for bending the touch-sensitive plate 18 according to multiple natural modes (i.e. a fundamental mode and multiple harmonic modes). It also comprises a receiver 24 programmed to capture a signal that is characteristic of the resonant vibration of the touch-sensitive plate from the transducer R2, the spectrum of this captured signal comprising peaks of amplitude at the frequencies of the natural modes of the plate in the direction D2. In the absence of contact on the touch-sensitive plate 18, the natural modes detected are characteristic of its width. Therefore, in the presence of a contact on the touch-sensitive plate 18, if the line D1 is considered to be the y-axis of the frame of reference related to the touch-sensitive plate, the natural modes detected are offset relative to the natural modes that are detectable in the absence of contact, and these offsets are characteristic of the y position of the contact.

In addition, the two receiving transducers R1 and R2 can be connected to two analog/digital converters, themselves connected to or integrated with the receiver 24. The analog/digital converters and the receiver 24 are capable of performing a sampling of the signals captured on at least 8 bits, or preferably on 10 bits, 12 bits, or more, at a rate of at least 200 kHz.

To estimate the values of the x position and the y position of a contact, the central processing unit 12 comprises an analysis module 28 programmed to compare the detected natural modes to reference non-contact natural modes in the considered direction, to deduce the respective offsets of these detected natural modes and then to estimate the position of the contact based on these offsets. This estimate can be done using pre-established mathematical formulas, for instance deduced by interpolation and stored in memory 30, or using comparison against previously measured offsets for a set of predetermined positions stored in memory 30 in the form of reference vectors or of a correlation table between frequency offsets and contact positions. By the one-dimensional analogy of the vibration of a guitar string, it has been observed that the closer one gets to the receiving transducer in a considered direction (direction of the line D1 for the transducer R1 and D2 for R2), the more the fundamental mode and harmonic frequencies increase.

The simultaneous knowledge of the fundamental and possibly harmonic frequency offsets along the two lines D1 and D2 therefore identifies the (x, y) position of the contact. The transmitting transducers E1 and E2 are advantageously excited alternately along the lines D1 and D2 to limit confusion between the natural frequencies of both directions. However, the receiving transducers R1 and R2 can continuously capture signals along the line D1 and the line D2.

Therefore, for each contact on the touch-sensitive plate 18, using a finger or a stylus 32, we get a location (x, y) of this contact, which can for example be viewed on a screen (not shown). By extension, since waves can be transmitted regularly by the transmitting transducers E1 and E2, a series of contacts can be detected on the touch-sensitive plate 18, forming a tracing 34 whose representative kinematic curve, obtained by interpolation of the tracing, can be viewed on a screen.

According to the embodiment illustrated in FIG. 1, the touch-sensitive plate 18 is integrated into an interactive tablet object 16, itself connected to the central processing unit 12 that is external to the object 16. According to another possible embodiment, the touch-sensitive plate 18 can be transparent, made of glass and included in an onboard electronic device including the central processing unit 12, such as a mobile phone or any other portable personal digital assistance device. In this case, it can also fulfill the function of a screen to display the kinematic curve obtained by interpolation of the detected tracing 34.

Note that, in a simple application of a thin touch-sensitive plate that is flat and rectangular, such as is illustrated in FIG. 1, the estimate of the frequency offset of the single fundamental natural mode in each of the two main directions (length and width) can be enough to identify the position of the contact. Fundamental mode is especially attractive because it is associated with the fewest vibration nodes on the touch-sensitive plate 18, especially only the zones of attachment between the touch-sensitive surface and its frame along the preferred directions D1 and D2. But when the touch-sensitive surface becomes more complex, including when it is no longer flat, such as a three-dimensional shell with a polygonal periphery, it may be advantageous to adjust the following parameters to remove any ambiguity regarding the position of the contact:

increase the number of transmitting/receiving transducer pairs arranged at the fixed ends of centerlines of dimensions that are characteristic of the touch-sensitive surface (for example, length, width, diagonal, largest characteristic dimension, and smallest characteristic dimension), while bearing in mind that this may cause undesirable pairing effects, or increase the number of fundamental and harmonic frequencies for which the offset is estimated due to the presence of a contact.

In addition, as indicated above, the closer the contact is to the receiving transducer located at a fixed point in a considered direction (direction of the line D1 for the transducer R1 and D2 for R2), the more the fundamental and harmonic mode frequencies increase. In theory, although frequency offset is never as much in two-dimensional or three-dimensional applications as in the one-dimensional example of the vibrating guitar string, where the fundamental resonance is inversely proportional to the length of the active section of string, the resonance frequencies can increase significantly and even become infinite when approaching the receiving transducer, which requires an extension to the range for searching for these resonant frequencies.

It is deduced in particular that, when the contact is located midway between the transmitting transducer and the receiving transducer in a given direction, the resonance frequencies in that direction are at most doubled.

Also, in the case of a thin rectangular plate or a three-dimensional shell with a more complex shape, with PZT piezoelectric transducers, in a linear pattern, and at a low output electrical impedance, there is an invariance in the transmitting and receiving roles of a pair of transducers on the output signal. Therefore, in all cases, at least one of the spectrums of signals captured by one of the two transducers comprises natural frequencies having at most doubled.

In a preferred embodiment, midway between the transmitting transducer and the receiving transducer in a given direction, when the contact becomes closer to the receiver than the transmitter, the transmitter therefore switches to receiver mode, and the receiver switches to transmitter mode. The switch can be done on the basis of a presupposed approximate location of the contact. Therefore, by switching the role of the transducers between transmitter and receiver and therefore switching the direction of the coordinate axes, the search for the resonant frequency can be limited to a band ranging from single to double the corresponding resonance frequency in the absence of contact. Also as a result, if only the position of the contact is deduced from the frequency offset in fundamental mode, the spectrum of excitation of a transmitting transducer can advantageously be a pulse with a frequency modulated carrier, the modulation being linear over time and between the reference fundamental resonant frequency and the double of that frequency in the considered direction. In this embodiment, the transducers E1 and E2 are therefore equally connected to the receiver 24, and the transducers R1 and R2 to the transmitter 22. Each transducer E1, E2, R1, and R2 can therefore be requested by the central processing unit 12 for transmitting or receiving.

Figure 2:
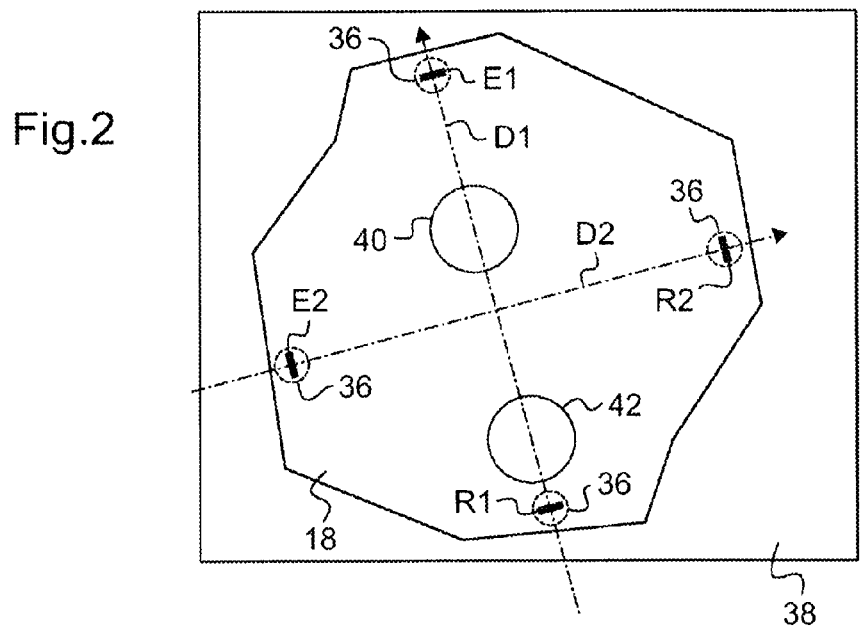

In the embodiment illustrated in FIG. 2, the touch-sensitive surface 18 is presented in the form of a three-dimensional shell with a complex shape and with no particular line of symmetry. This shell is attached by four fittings placed in the zones of attachment 36 to a frame 38 forming a rigid support. It includes, for example, as in the previous example, two pairs of transmitting/receiving transducers E1, R1 and E2, R2 arranged in two main directions D1 and D2 that are characteristic of its shape.

As in the previous example, the transmitting transducers E1 and E2 alternate in their transmissions, while the receivers R1 and R2 receive simultaneously. In addition, the transmitter/receiver roles can be switched, depending on the contact position observed in a first approximation, as recommended also in the previous example.

In this more complex configuration, instead of measuring only the frequency offset of the fundamental resonant frequency of the shell, it is excited by an electric pulse with a linear frequency modulated carrier, the carrier scanning N resonant frequencies of the shell, specifically the fundamental frequency and the (N−1) first harmonic frequencies. These first N resonant frequencies are usually the most sensitive to the frequency offset caused by a pinpoint contact or by a touch. In addition, by focusing primarily on the lowest frequency resonances of the shell, for which the dimensions of the shell are comparable to the wavelengths, the contact surface, whether for a finger or a stylus, is always negligible compared to the active surface of the shell, generally less than 1% of the active surface of the shell, such that the frequency offset is practically the same, depending on whether the contact is established with flesh or with the tip of a plastic stylus. The determination of the contact position is done then by comparing an offset vector with N measured components to a base of reference vectors with N components, each corresponding to a predetermined location.

Optionally yet advantageously from an ergonomic and sensory point of view, a device according to the invention may provide a validation signal to the user each time a contact is detected. Therefore, the central processing unit 12 can also be programmed to, in response to the detection of a frequency offset of at least a natural mode of vibration of the touch-sensitive surface 18, due to the presence of a locally deforming contact, excite at least one of the transmitting transducers E1 or E2 using an electrical validation signal that generates vibroacoustic waves. The vibroacoustic frequency of these vibrations generated by the validation signal can be linked to the detected frequency offset. Specifically, if a frequency offset of at least the two fundamental natural modes in the two directions D1 and D2 is detected, this vibroacoustic frequency can be multiple and comprise at least the offset fundamental mode frequencies. To perform this additional function of the central processing unit 12, the transmitter 22 must be connected to the spectrum analysis module 26 and/or the analysis module 28.

For these vibroacoustic validation waves to be correctly perceived by the user, it is important for their amplitude to be substantially greater than the other elastic mechanical waves transmitted on the touch-sensitive surface for locating contacts. By "substantially greater" amplitude, this means an amplitude that is greater so that the user perceives the specificity of the validation signal either by touch or by hearing. An amplitude from ten to a hundred times greater than the other elastic mechanical waves qualifies.

Finally, for these vibroacoustic validation waves to be correctly perceived by the user, it is also important for their duration to be sufficient. In particular, a duration of between 5 ms and 150 ms qualifies.

A predetermined frequency offset of the resonant frequencies of the shell is also possible, not by pressing on the shell at any points, but by first creating locally delineated zones that are functionalized with a specific deformability, such as monostability or asymmetric bistability. Such locally delineated and functionalized zones are illustrated in FIG. 2 with the references 40 and 42. They are, for example, circular in shape and formed by stamping the shell 18 in predetermined locations or by injection molding for a local reduction in the thickness of the shell in their periphery.

Providing these locally delineated and functionalized zones with a specific deformability in the shell 18 has the advantage of generating, when these zones are deformed by pressure along a specific predetermined path/effort law, frequency offsets of resonance of the shell 18 that are much greater than the offsets mentioned earlier more generally due to contacts at any points of the shell.

In addition, these frequency offsets can vary between two extreme positions in a monostable or bistable zone, a rest position and a depressed position, so as to facilitate recognition of the actuating of the zone or to increase the immunity of this zone to excitations by interference noise. By functionalizing these zones, meaning by associating their "rest" or "depressed" positions with predetermined functions, we make the shell 18 sensitive to interactions while limiting the inadvertent activations of functions tied to these zones. Each position of one of these zones is both associated with a function and a reference frequency offset vector that can easily be detected and distinguishable from other reference vectors.

In the case of bistable zones, when such a zone is depressed, its reset, meaning its return to its original non-depressed position, can be obtained by combining two bistable zones that cannot be depressed simultaneously, the depressing of one resetting the other, and vice versa.

The presence of these zones on the shell 18 in FIG. 2, or more generally on any deformable touch-sensitive surface, can be seen as an alternative or a complement to the principle of locating a deforming contact as detailed in reference to FIG. 1.

The shell 18, when it is subject to a pressure in one of these zones, can be deformable with strokes of a few millimeters and reflect path/effort laws in these zones that are increasing monotone, increasing non-linear, bistable, or monostable.

Figure 3A:
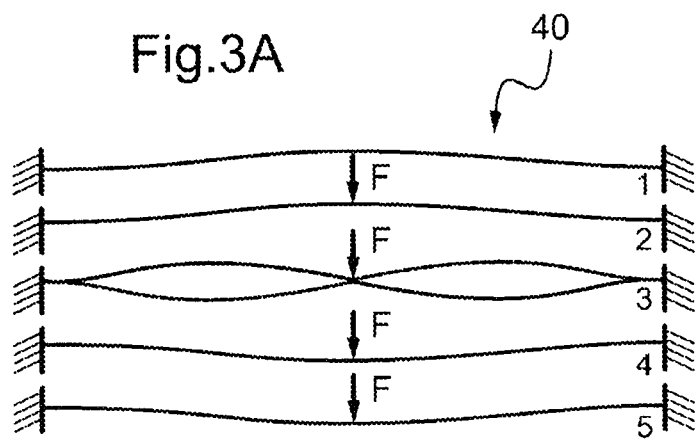

FIG. 3A schematically shows a section of a bistable zone, for example one of zones 40 or 42 in FIG. 2. The ends located at the periphery of this bistable zone are schematically shown as being attached for the sake of simplicity, but they are actually connected to the rest of the deformable shell 18, which is also capable of deforming, to a lesser extent, in the presence of a contact in the bistable zone.

In a first position "1" of rest of the bistable zone 40 or 42, this does not undergo any particular pressure, and it remains in a stable balance.

In a second intermediary position "2" of imbalance, it undergoes pressure causing a deformation of its surface according to a mode of deformation imposed by the laws of elasticity for the material used.

By maintaining this pressure, it passes to a third intermediary position "3" of unstable balance, called a switching, and then to a fourth intermediary position "4" of imbalance before reaching a fifth "depressed" position of stable balance.

In terms of potential energy, the application of a force perpendicular to the surface of the zone 40 or 42, originally in a rest position, causes lateral stress in the zone that stores bending potential energy until the switching position, and then switches and falls back into a well of potential corresponding to the depressed position.

Figure 3B:
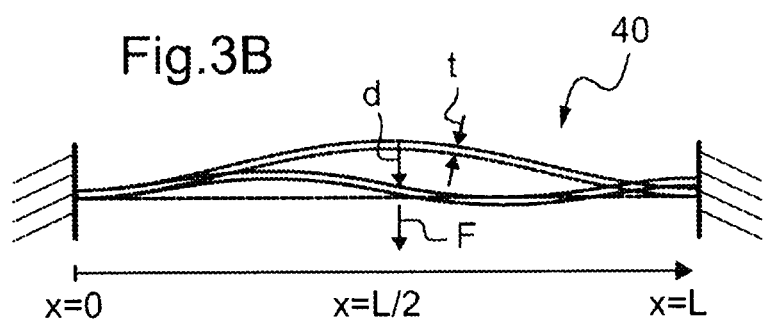
Figure 3C:
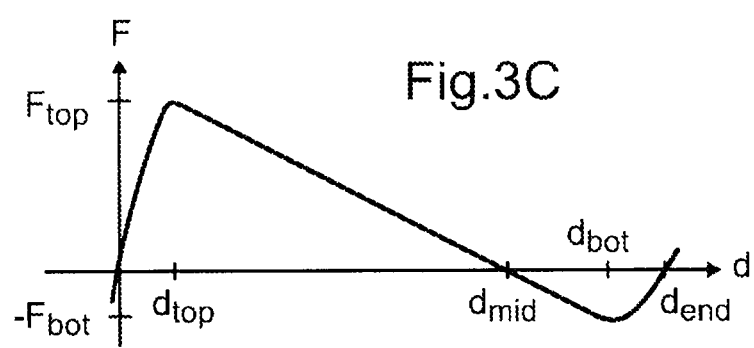

If zone 40 or 42 is at asymmetric bistability, and noting d the normal displacement measured from the center of its surface and F the intensity of a normal force applied at its center (see FIG. 3B), we get the path/effort law represented in FIG. 3C.

In FIG. 3C, the position d=0, associated to a null force, corresponds to the first stable position "1" of the bistable zone. The position $0<d<d_{top}$ corresponds to the position "2" before changing the deformation elastic mode of the bistable zone. The position $d=d_{top}$, associated with a positive force threshold of intensity $F_{top}$ generating a switch of the bistable zone, corresponds to the position "3". The position $d=d_{mid}$ corresponds to a null force located between the two stable positions of the bistable zone. The position $d=d_{bot}$, associated with a negative force threshold of intensity $-F_{bot}$, and generating a switch back to the first stable position "1", also corresponds to an elastic deformation along position "3". The position $d_{top}<d<d_{end}$ corresponds to the position "4" after changing the deformation elastic mode of the bistable zone. The position $d=d_{end}$, associated to a null force, corresponds to the second stable position "5" of the bistable zone.

The asymmetry of the bistability of the zone 40 or 42 is related to the difference in intensity between $F_{top}$ and $F_{bot}$. In this case, the static stress associated with the two stable positions "1" and "5" are different and associated with different dynamic elasticity constants such that the frequencies of resonance of the shell 18 associated with the two stable positions will also be different. This will make it possible to easily distinguish these two positions.

Similar reasoning is applicable if the zone 40 or 42 is not bistable, but rather monostable. In this case, the path/effort law also presents a break of slope, but there is no stable position at a null force, other than the starting position. Zone 40 or 42 can then be depressed until a limit position of elasticity for which the slope increases very sharply. When the zone is in this limit position, the lateral static stress imposed on the shell 18 offsets its resonance frequencies by a recognizable quantity that is characteristic, on the one hand, of a contact on this zone and, on the other hand, of its depressing. In other words and more specifically, the frequency offset is then the accumulation of a blocking of the fundamental resonance of the shell 18 along the considered line and a change in consistence related to changes in internal mechanical stresses inside the shell that modify its properties of elasticity, and therefore especially the speed of propagation of the bending waves and consequently the associated fundamental and harmonic resonance frequencies.

In addition, to measure the force of a contact on such a monostable zone, we can first record the relative frequent offsets between the two end positions of the deformable zone.

Similar reasoning is also applicable for a deformable zone according to a more monotone path/effort law, for example growing monotone.

Finally, when the shell 18 comprises multiple locally delimited zones that are functionalized for a specific deformability, they can be different sizes, which causes specific frequency offsets for each of them. Note that these bistable or monostable zones can be used to create specific frequency offsets constant over time and then to create, in the shell 18, situations of tension or bistable or monostable static stress associated with bistable or monostable fundamental and harmonic resonance frequencies.

FIG. 4 shows a section view of the shell 18 illustrated in FIG. 2 on a plane including the line D1, according to a first variant. A first spacer 44 rigidly attaches the shell 18 to the frame 38 at the location of transducer E1. A second spacer 46 rigidly attaches the shell 18 to the frame 38 at the location of transducer R1. Between these two spacers, the shell is deformable, particularly around zones 40 and 42, which are, in this variant, formed by stamping so as to be monostable. Also according to this variant, the transducers E1 and R1 are PZT piezoelectric chips whose shape promotes radiation in the direction D1. They are, for example, adhered to the shell 18 or integrated within its depth in immediate vicinity of the spacers 44 (for E1) and 46 (for R1). Finally, the spacers are, for example, made in the same mold as the shell 18. They can also be riveted or made to grip the shell 18 by means of screws.

FIG. 5 shows a section view of the shell 18 illustrated in FIG. 2 on a plane including the line D1, according to a second variant. According to this second variant, zones 40 and 42 are formed in the shell 18 by injection molding to provide a local reduction in the thickness of the shell in their periphery in order to be bistable. Also according to this variant, the transducers E1 and R1 are integrated into the spacers 44 and 46, respectively, themselves made in the same mold as the shell 18.

Figure 6:
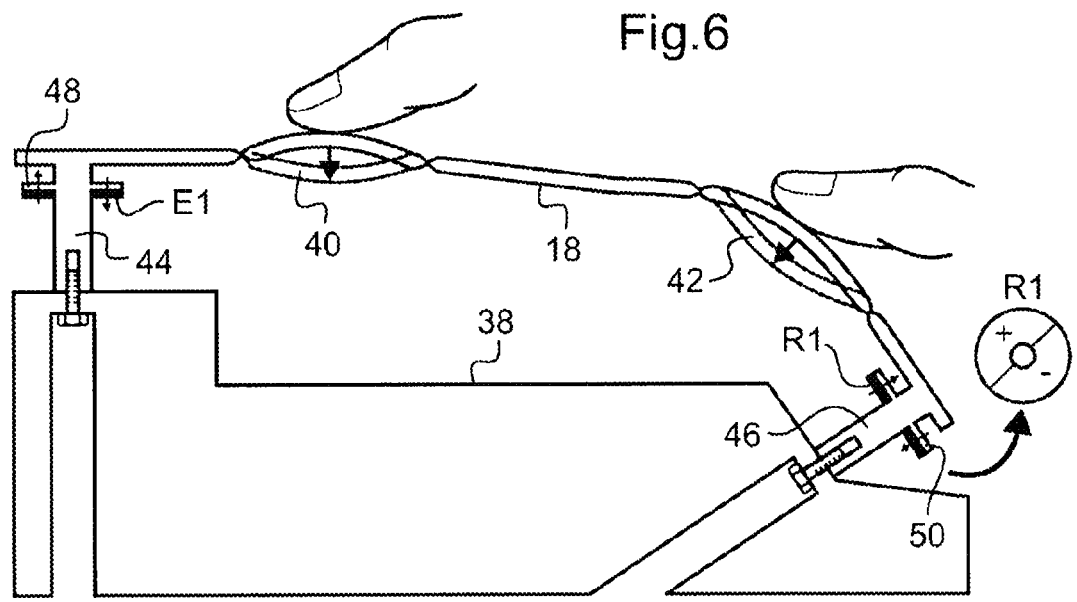

FIG. 6 shows a section view of the shell 18 illustrated in FIG. 2 on a plane including the line D1, according to a third variant. According to this third variant, the zones 40 and 42 are formed in the shell 18 by injection molding, as in the second variant. However, the transducers E1 and R1 are ring-shaped, with alternating polarity and mounted respectively on ring turnings 48 and 50 of the spacers 44 and 46. The ring turnings 48 and 50 of these spacers 44 and 46 are, for example, obtained by injection molding. Finally, the transducers E1 and R1 are PZT ceramics with a silver return from the internal electrode to facilitate electrical contact without having to use a conductive adhesive.

The spacers 44 and 46 are made in the same mold as the shell 18 and attached to the frame 38 by screws. They are full between their ring turning and the shell 18. In this configuration, the thickness of the ring turning of a spacer is preferably equal to the diameter of the straight section of the spacer. Alternatively, the spacers 44 and 46 could be hollow and the shell 18 attached to the frame 38 by rivets crossing through these spacers in their length. In this configuration, the thickness of the ring turning of a spacer is preferably equal to double the thickness of the internal wall of the straight section of the spacer.

An advantage of this third variant resides in the fact that the transducers E1 and R1, ring-shaped with alternating polarity, generate or detect a mode of bending transmitted or received from the shell 18 via the spacers 44 and 46. The ring turnings of the spacers, on which the ring-shaped transducers are adhered, are an effective means of coupling the vibrational energy of bending the shell 18 with bending waves in the transducers. In addition, the dividing line between the alternating polarity of each transducer involves a directional pattern for the bending wave generated in the shell 18. Therefore, in the case of a shell 18 with a simple shape, the dividing line between the alternating polarity can be positioned such that it is parallel to the edge of the shell. The intensity of transmitting and/or receiving is then at a maximum in the centerline perpendicular to the dividing line between the alternating polarities. This configuration of transducers, also applied to the transducers E2 and R2, can best generate and detect bending modes selectively within the shell 18 and make the method of locating by frequency offsets more sensitive to pinpoint contacts. Directional transducers can also best uncouple the lines D1 and D2 of the shell 18. The decoupling is also easier if the shell is not rigidly attached over its entire circumference, but rather only locally in the zones of attachment 36.

Another advantage of this third variant is that is makes the transmitting and receiving transducers completely invisible.

In addition, another advantage of providing spacers for the attachment is allowing the shell, in pulse transmission mode, to effectively function as a speaker due to the presence of a resonance volume between the shell and its support. In pulse receiving mode, the shell can serve as a receiving antenna for receiving transducers and function as a high-sensitivity microphone.

Figure 7:
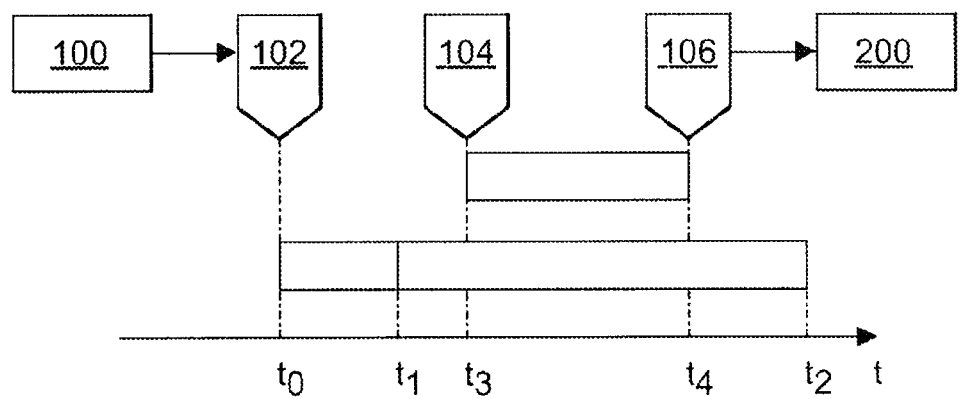
FIG. 7 illustrates the main successive steps of a method for locating a locally deforming contact on a deformable touch-sensitive surface of an object, according to one embodiment of the invention.

A method of locating a locally deforming contact on a deformable touch-sensitive surface 18, such as the touch-sensitive plate in FIG. 1 or the three-dimensional shell in FIG. 2, will now be detailed with reference to FIG. 7.

At regular intervals, such as at a rate of several dozen measurements per second, specifically 50 to 100 measurements per second, the central processing unit 12 launches a step 100 to monitor the outer face of the deformable touch-sensitive surface 18, followed by a step 200 to locate a contact.

For each monitoring step 100, at an instant $t_0$, elastic mechanical pulse waves (102) are transmitted in a main characteristic direction (D1 or D2) in the deformable touch-sensitive surface 18 from a transmitting transducer (E1 or E2, for example). They are propagated by two distinct propagation phases: a first transition propagation phase, extending from the instant $t_0$ to an instant $t_1$, during which the wave front transmitted reaches the corresponding receiving transducer (R1 or R2, for example) in the considered direction; a second stationary propagation phase, extending from the instant $t_1$ to an instant $t_2$ of end of monitoring, during which the transmission of elastic mechanical pulse waves in the considered direction generates a resonant vibration of the deformable touch-sensitive surface 18 in at least one natural mode.

The transmitting transducer chosen for this monitoring step is, for example, excited by electrical rung shape pulses, Dirac pulses, or preferably T-duration pulses with a linear frequency modulated carrier on a spectrum $[f_0; 2f_0]$ according to a law, such as:

$$\begin{cases} E(t) = E_0 \sin\left[2\pi\left(f_0 + \frac{f_0}{T}t\right)t\right], & \text{si } 0 < t < T \\ E(t) = 0, & \text{si } t \notin [0, T], \end{cases}$$

where $f_0$ is the fundamental resonant frequency of the touch-sensitive surface without contact in the considered direction.

The T-duration of the pulse can be chosen to be around 10 ms. In addition, instead of a sine pulse, a linear frequency modulated square pulse may be preferable. Finally, for a touch-sensitive surface with a complex shape, the electrical pulses for excitement of the transmitting transducer can be modulated on an extended spectrum $[f_0; 20f_0]$.

Following the establishment of at least one natural mode of resonant vibration of the deformable touch-sensitive surface 18 in the considered direction, the monitoring step 100 comprises a detection 104 of this resonant vibration by the associated receiving transducer in that direction, to obtain at least one captured signal. This detection 104 is launched at an instant $t_3$ and continues until an instant $t_4$ of end of detection 106 by the measuring of a signal captured during this time interval.

The monitoring step 100 is followed by a step 200 for locating a contact, during which the central processing unit 12 identifies and locates a potential deforming contact on the touch-sensitive surface 18. More specifically, during this step 200, the spectrum analysis module 26 of the central processing unit 12 detects at least one peak in amplitude of the signal spectrum captured in a predetermined frequency band. This peak in amplitude is located at the frequency of a natural mode of vibration of the touch-sensitive surface 18, including at least the fundamental natural mode. When multiple peaks in amplitude are detected, it is the fundamental natural mode, but also at least one harmonic natural mode. Then, it provides the result of this detection to the analysis module 28. The analysis module 28 compares the detected natural modes to corresponding non-contact reference natural modes in the considered direction, deduces the respective offsets of these detected natural modes and then estimates the position of a possible contact based on these offsets. If the touch-sensitive surface has specific monostable zones, it is also possible, as mentioned above, to measure the force of the contact. Finally, optionally, as also mentioned above, a validation signal can be transmitted in response to detecting and locating a contact.

It clearly appears that a device and method for locating a locally deforming contact on a deformable touch-sensitive surface, such as those described above, make it possible to locate and characterize contacts as different as a pinpoint or larger touch, a short or long touch, a stroke or inimical touch, etc., provided that the resonant surface is sufficiently blocked and for a sufficient time, to cause natural frequency offsets. From this point of view, the fact that the touch-sensitive surface is deformable lengthens the duration of contacts and makes them easier to detect, including when they are impacts.

The implemented principle of estimating frequency offsets is also simple enough to be able to be implemented in trade microcontrollers and to provide a short response time, usually between 1 ms and 100 ms. It can thus be implemented so as to be repeated for detection tracings (i.e. a series of contacts).

Another advantage is the ability to obtain satisfactory results, for example an accurate millimeter location, from a small number of transmitters and receivers. Specifically, at a minimum, a pair of transmitting and receiving transducers per main direction characteristic of the touch-sensitive surface may be enough.

In addition, by positioning the transducers at fixed points (vibration nodes) of the deformable touch-sensitive surface and by requiring a directional transmission of elastic mechanical waves, it is possible to find the location of a contact simply from an offset of fundamental frequencies of the touch-sensitive surface in its main directions, when the surface has a simple shape.

Finally, in an embodiment consisting of providing locally delineated zones that are functionalized for a specific deformability in the touch-sensitive surface, it is possible to design a low-cost keyboard containing a limited number of transducers, the electronics for processing also being compact and requiring little energy. Furthermore, this embodiment exhibits an increased immunity to vibrations, ambient interference noise, adhesives, and dirt in the absence of interaction, since the touch-sensitive surface must be blocked or even mechanically strained in these locally deformable zones for the frequency offsets that are characteristic of an interaction to appear. It also has the advantage of providing a keyboard without mechanical keys.

It has also been shown that the invention is not limited to flat glass surfaces, but applies also to curved surfaces and plastic or metal shells, which increases the possible applications.

Some possible industrial applications of devices and the method described above include specifically but not exhaustively:
- touch-sensitive displays for video game consoles, mobile phones, personal digital assistance devices, and LCD screens, in a context of user machine interface that dynamically interprets contacts,
- flat or curved touch-sensitive keyboards, touch-sensitive control buttons arranged by injection molding onto objects with complex shapes,
- touch-sensitive shells for robots or toys, capable of perceiving various kinds of touches, including strokes, hits, etc., to improve intuitive interaction between these robots and humans,
- touch-sensitive shells for robots or toys with specific functionalized zones,
- closed three-dimensional shells forming a resonance box, particularly suitable for making touch-sensitive musical instruments, such as a piano with programmable keys and electromechanical excitation, the excitation comprising two steps, the first consisting of detecting the position of contact of a finger on the shell and the second consisting of producing, immediately after the location of the contact, a sound pulse response by exciting at least one transmitter transducer by a power signal at a frequency corresponding to the measured and desired frequency offset, possibly spectrally enriched based on the desired acoustic sound.

Also note that the invention is not limited to the embodiments described above. As is known to those skilled in the art, there are various modifications that can be made to the embodiments described above, with respect to the instruction that has been disclosed. In the following claims, the terms used should not be interpreted as limiting the claims to the embodiment presented in this description, but should be interpreted to include all of the equivalents that the claims intend to cover by their formulation and whose projection is within reach of those skilled in the art by applying their general knowledge to the instruction that has just been disclosed.

The invention claimed is:

1. A device for locating a locally deforming contact on a deformable touch-sensitive surface of an object, comprising:
   at least one pair of transducers, wherein each pair includes one transmitting transducer and one receiving transducer arranged at opposite ends of one and the same straight line that is characteristic of the deformable touch-sensitive surface, the transmitting transducer of each pair configured in transmitter mode to transmit elastic mechanical waves propagating in the deformable touch-sensitive surface of the object, and the receiving transducer of each pair configured in receiver mode to capture elastic mechanical waves propagating in the deformable touch-sensitive surface of the object; and
   circuitry, connected to the transmitting and receiving transducers, configured to
      detect a frequency offset of at least one natural mode of a resonant vibration of the touch-sensitive surface due to presence of the locally deforming contact, the vibration being produced by propagation of the waves transmitted in the touch-sensitive surface,
      locate the locally deforming contact by analyzing a frequency offset, and
      switch the transmitting transducer into receiver mode and the receiving transducer into transmitter mode when the locally deforming contact is detected closer to the receiving transducer than to the transmitting transducer based on a presupposed approximate prior location of the locally deforming contact.

2. The device according to claim 1, comprising plural rigid attachment zones between the deformable touch-sensitive surface and the object, these zones forming nodes of resonant vibration for the touch-sensitive surface, and in which the transmitting and receiving transducers are located in these zones.

3. The device according to claim 1, in which each transducer in a pair is located in a zone that is diametrically opposite that of the other transducer of the same pair in the deformable touch-sensitive surface.

4. The device according to claim 1, wherein each line that is characteristic of the deformable touch-sensitive surface is a line of symmetry for the touch-sensitive surface.

5. The device according to claim 4, in which the transmitting transducers are directional transmission transducers for elastic mechanical waves and are oriented to present a directional pattern of maximum intensity in the direction of the other transducer within the same pair.

6. The device according to claim 1, in which the transducers are connected to spacers that attach the deformable touch-sensitive surface to a rigid frame, such that vibrations are caused in the spacers and transmitted to the deformable touch-sensitive surface when such vibrations come from transmitting transducers or transmitted to receiving transducers when they come from the deformable touch-sensitive surface.

7. The device according to claim 1, in which the circuitry is further programmed, in response to detecting the frequency offset due to the presence of the locally deforming contact, to excite at least one transmitting transducer using an electrical validation signal that generates vibroacoustic waves in which the sound frequency is related to the detected frequency offset and the amplitude is substantially higher than other elastic mechanical waves transmitted in the touch-sensitive surface for the location of the contact.

8. A communicating object comprising:
   a shell with a deformable touch-sensitive surface; and
   a device that includes:
      at least one transmitting transducer configured to transmit elastic mechanical waves propagating in the deformable touch-sensitive surface of the object, at least one receiving transducer configured to capture elastic mechanical waves propagating in the deformable touch-sensitive surface of the object, and circuitry, connected to the transmitting and receiving transducers, configured to detect a frequency offset of at least one natural mode of a resonant vibration of the touch-sensitive surface due to presence of the locally deforming contact, the vibration being produced by propagation of the waves transmitted in the touch-sensitive surface, and locate the locally deforming contact by analyzing a frequency offset, wherein the deformable touch-sensitive surface of the shell comprises at least one locally delineated zone which is a portion of the deformable touch-sensitive surface located along the propagation path of the elastic mechanical waves between the transmitting transducer and the receiving transducer, the locally delineated zone being configured with a specific deformability in a direction perpendicular to the propagation path of the elastic mechanical waves, such as monostability or asymmetric bistability, such that the locally delineated zone is formed by stamping when it has a specific deformability of monostability and the locally delineated zone is formed by injection molding to have a local reduction in thickness at its periphery when it has a specific deformability of bistability, and such that when pressed, the locally delineated zone is configured to generate frequency offsets greater than frequency offsets generated at a point in the touch sensitive surface other than the locally delineated zone.

9. A method for locating a locally deforming contact on a deformable touch-sensitive surface of an object, comprising:

transmitting, by a transmitting transducer of at least one pair of transducers elastic mechanical waves propagating in the deformable touch-sensitive surface of the object wherein the pair of transducers includes the transmitting transducer and a receiving transducer arranged at opposite ends of one and the same straight line that is characteristic of the deformable touch-sensitive surface, the transmitting transducer being configured in transmitter mode, and the receiving transducer of each pair being configured in receiver mode;

receiving, by the receiving transducer, the elastic mechanical waves propagating in the deformable touch-sensitive surface of the object;

detecting a frequency offset of at least one natural mode of a resonant vibration of the touch-sensitive surface due to presence of the locally deforming contact, the vibration being produced by propagation of the waves transmitted in the touch-sensitive surface;

locating the locally deforming contact by analyzing a frequency offset; and switching the transmitting transducer into receiver mode and the receiving transducer into transmitter mode when the locally deforming contact is detected closer to the receiving transducer than to the transmitting transducer based on a presupposed approximate prior location of the locally deforming contact.

10. The method according to claim 9, in which the transmitting comprises transmission of elastic mechanical pulse waves with frequencies scanned in a predetermined range of frequencies including at least one fundamental natural frequency of resonant vibration of the touch-sensitive surface without contact and double of that frequency.

11. The communication object according to claim 8, wherein the deformable touch-sensitive surface is not flat and includes at least two locally delineated zones, such that at least one of the locally delineated zones is disposed at an incline with respect to another of the locally delineated zones.

* * * * *